United States Patent
Fukada

(10) Patent No.: US 9,356,456 B2
(45) Date of Patent: May 31, 2016

(54) CHARGING DEVICE

(75) Inventor: Yoshiki Fukada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 13/704,458

(22) PCT Filed: Jun. 16, 2010

(86) PCT No.: PCT/JP2010/060206
§ 371 (c)(1),
(2), (4) Date: Dec. 14, 2012

(87) PCT Pub. No.: WO2011/158346
PCT Pub. Date: Dec. 22, 2011

(65) Prior Publication Data
US 2013/0082645 A1    Apr. 4, 2013

(51) Int. Cl.
*H01M 10/44* (2006.01)
*H01M 10/46* (2006.01)
*H02J 7/00* (2006.01)
*H02J 7/35* (2006.01)

(52) U.S. Cl.
CPC ............. *H02J 7/0052* (2013.01); *H02J 7/0013* (2013.01); *H02J 7/35* (2013.01); *Y02E 10/566* (2013.01); *Y02T 10/7055* (2013.01)

(58) Field of Classification Search
USPC ......................................................... 320/101
See application file for complete search history.

(56) References Cited

U.S. PATENT DOCUMENTS

| | | | |
|---|---|---|---|
| 6,806,684 B2 * | 10/2004 | Matsuyama | 320/112 |
| 6,847,834 B1 * | 1/2005 | Leem | 455/572 |
| 2008/0093930 A1 | 4/2008 | Chen | |
| 2008/0122518 A1 | 5/2008 | Besser et al. | |
| 2009/0302681 A1 | 12/2009 | Yamada et al. | |
| 2010/0026233 A1 * | 2/2010 | Lee et al. | 320/101 |
| 2011/0074334 A1 * | 3/2011 | Wang et al. | 320/101 |

FOREIGN PATENT DOCUMENTS

| | | |
|---|---|---|
| CN | 101375482 A | 2/2009 |
| JP | A-7-154930 | 6/1995 |
| JP | A-11-46457 | 2/1999 |
| JP | A-2004-317279 | 11/2004 |

* cited by examiner

*Primary Examiner* — Samuel Berhanu
(74) *Attorney, Agent, or Firm* — Oliff PLC

(57) ABSTRACT

Disclosed is a charging device capable of appropriately charging of a battery while preventing battery depletion. In a charging system including a charging device, when the output power from a solar battery is equal to or greater than a predetermined value, power is supplied to a charging control system which controls charging of batteries. Accordingly, when the output power from the solar battery is small, since the charging control system will not start, no power is consumed in the charging control system. As a result, battery depletion can be prevented. When the output power from the solar battery is equal to or greater than the predetermined value, charging of the battery is performed by the charging control system, thereby appropriately performing charging of the batteries.

5 Claims, 9 Drawing Sheets

CHARGING DEVICE

TECHNICAL FIELD

The present invention relates to a charging device of a solar battery which is mounted in an electric automobile or the like.

BACKGROUND ART

In recent years, photovoltaic power generation has been attracting attention as a clean energy source from the viewpoint of global environment conservation. A solar battery has recently been mounted in a hybrid car (HV car) or an electric automobile (EV car). As a charging device of a solar battery for an electric automobile, for example, a charging device described in Patent Literature 1 is known. The charging device described in Patent Literature 1 includes a charger which enables charging of a solar battery and a battery through the contacts of a relay. In this case, when the output voltage from the solar battery reaches a given value, the contacts of the relay are opened to perform charging of the battery.

CITATION LIST

Patent Literature

[Patent Literature 1] Japanese Unexamined Patent Application Publication No. 7-154930

SUMMARY OF INVENTION

Technical Problem

On the other hand, the solar battery changes in output characteristics (V-I characteristics) depending on the weather (light-dark). For example, even when the output voltage is the same, since a current value differs due to a difference in weather, the output power may change. For this reason, even when the output from the solar battery is equal to or greater than a predetermined voltage, for example, if the weather is bad, the output power is lowered. In this case, since power is consumed due to control for activating the charging device of the solar battery, the battery may not be charged using the solar battery, and consequently, energy may be consumed.

Accordingly, as a solution for the above-described problem, mounting a system which monitors an output state of a solar battery, and only when a predetermined output power is obtained, charges a battery is considered. In this case, as the power for activating a monitoring system which monitors the output power of the solar battery, the power charged in the battery is used. However, if the monitoring system is activated during engine shutdown or the like, the battery may be depleted.

The invention has been accomplished in order to solve the above-described problems, and an object of the invention is to provide a charging device capable of appropriately performing charging of a battery while preventing battery depletion.

Solution to Problem

In order to solve the above-described problems, the invention provides a charging device which, when the power output from a solar battery is equal to or greater than a predetermined value, supplies power to a charging control system controlling charging of a battery, and when the power output from the solar battery is not equal to or greater than the predetermined value, supplies no power to the charging control system.

In this charging device, when the output power from the solar battery is equal to or greater than the predetermined value, power is supplied to the charging control system controlling charging of the battery, and when the power is not equal to or greater than the predetermined value, no power is supplied to the charging control system. Accordingly, when the output power from the solar battery is small, since the charging control system controlling charging of the battery is not activated, power is not consumed in the charging control system. As a result, power is not consumed in the charging control system, for example, during engine shutdown in a state where the output from the solar battery is lowered, thereby preventing battery depletion. When the output power from the solar battery is equal to or greater than the predetermined value, charging of the battery is performed by the charging control system, thereby appropriately performing charging of the battery.

It is preferable that the charging device further includes a power detection unit which is connected between the solar battery and the charging control system, and detects the power output from the solar battery, wherein the power detection unit is operated when the power output from the solar battery becomes equal to or greater than the predetermined value, and the power for activating the charging control system is supplied. In this case, when the output power equal to or greater than the predetermined value is supplied from the solar battery to the power detection unit, the power detection unit is operated and the power for activation is supplied to the charging control system, thereby appropriately activating the charging control system.

It is preferable that the charging device further includes a power cutoff unit which is connected between the solar battery and the power detection unit, and cuts off the power supply from the solar battery to the power detection unit, wherein the power cutoff unit cuts off the power supply from the solar battery to the power detection unit when the power supply to the charging control system is performed. In this case, power consumption in the power detection unit can be suppressed after the charging control system is activated. Therefore, the power output from the solar battery can be efficiently charged to the battery.

It is preferable that the charging device further includes a power source which supplies power to the charging control system through a bypass path, wherein, before the power cutoff unit cuts off the power supply from the solar battery to the power detection unit, power is supplied from the power source to the charging control system through the bypass path. In this case, even when the power supply to the power detection unit is cut off, power can be supplied to the charging control system.

It is preferable that the charging control system measures the power output from the solar battery, when the measured output from the solar battery is equal to or smaller than a predetermined determination threshold value, restarts the power supply from the solar battery to the power detection unit, and stops the operation. In this case, when the output from the solar battery is lowered, the operation of the charging control system stops, thereby reliably preventing battery depletion. If the power supply from the solar battery to the power detection unit restarts, even when the output power from the solar battery becomes equal to or greater than the predetermined value again, the charging control system can be operated.

It is preferable that the predetermined value of the power for operating the power detection unit is greater than the determination threshold value in the charging control system. When the predetermined value of the power for operating the power detection unit is set to be smaller than the determination threshold value, the control of the charging control system may end depending on the output power of the solar battery, and the charging control system may be inactivated. Simultaneously, the power detection unit may be turned on, and the charging control system may be repeatedly activated and inactivated. Accordingly, the predetermined value of the power for operating the power detection unit is greater than the determination threshold value in the charging control system, thereby appropriately controlling the on and off of the charging control system.

The power detection may be a relay circuit.

Advantageous Effects of Invention

According to the invention, it is possible to appropriately perform charging of a battery while preventing battery depletion.

DESCRIPTION OF EMBODIMENTS

Figure 1:
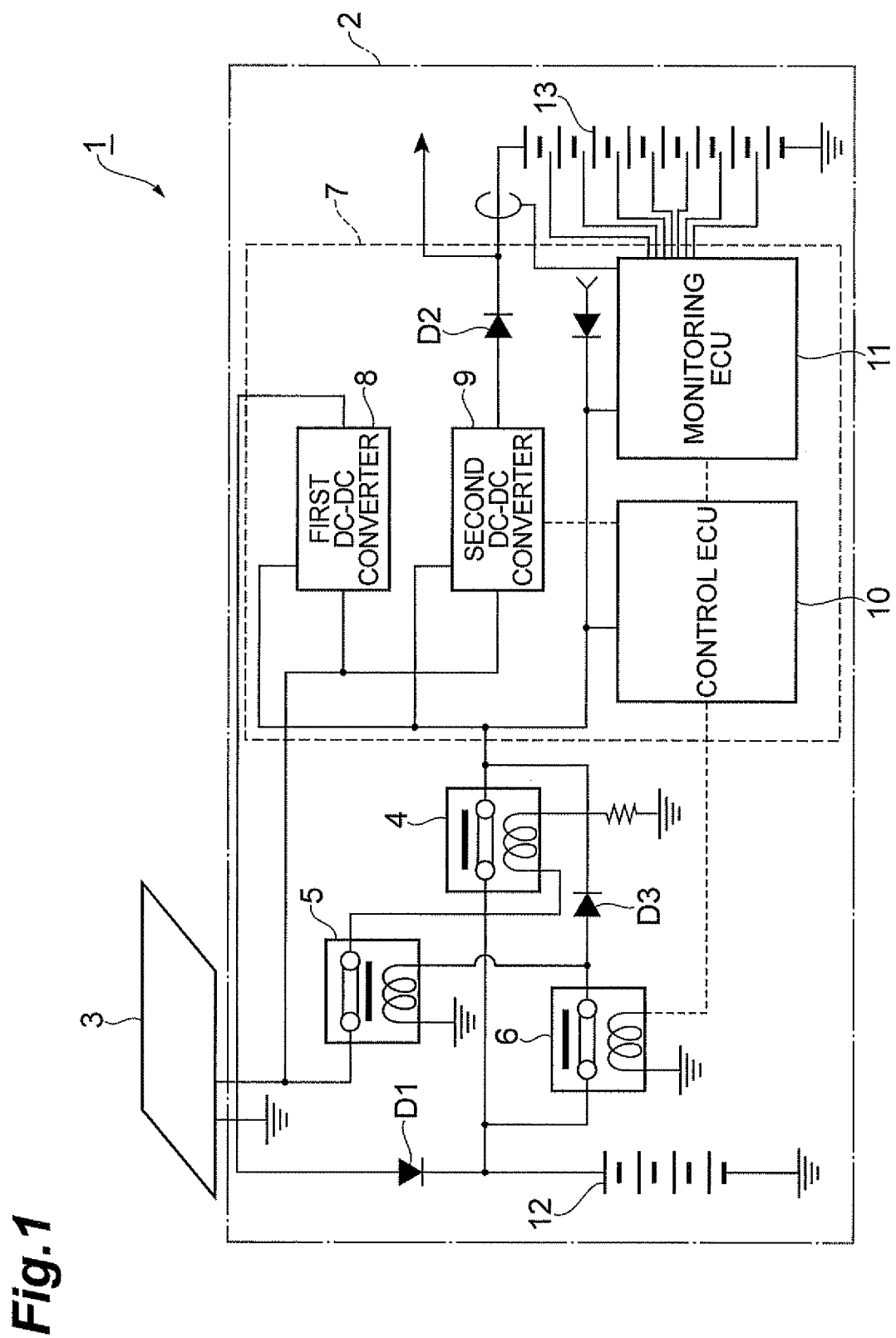
FIG. 1 is a diagram showing the configuration of a charging system including a charging device according to a first embodiment of the invention.

Hereinafter, preferred embodiments of the invention will be described with reference to the accompanying drawings. In the following description, the same components or the components having the same functions are represented by the same reference numerals, and overlapping description will be omitted. In the drawings, dotted lines which connect the components are wiring having a communication function.

First Embodiment

FIG. 1 is a diagram showing the configuration of a charging system including a charging device according to a first embodiment. As shown in FIG. 1, a charging system 1 is a system which is mounted in, for example, a vehicle (hybrid automobile, electric automobile, or the like), and charges the output from the solar battery 3 in a battery (power source) 12 and an HV battery 13 for hybrid.

The charging system 1 includes a solar battery 3 and a charging device 2. The charging device 2 includes a power detection unit 4, a power cutoff unit 5, a power supply unit 6, and a charging control system 7. The charging control system 7 includes a first DC-DC converter 8, a second DC-DC converter 9, a control ECU 10, and a monitoring ECU 11.

The solar battery 3 has, for example, a configuration in which a plurality of silicon solar battery cells are connected in series, and has an area of 0.6 $m^2$ and a rated output of 100 W and 42 V. The solar battery 3 is connected to the power cutoff unit 5, the first DC-DC converter 8, and the second DC-DC converter 9 described below, and outputs the power generated by sunlight to the respective units. It is preferable that the output voltage of the solar battery 3 is set to 42 V from the viewpoint of reducing a conversion loss while suppressing the risk of electric shock at the time of electric leakage.

The power detection unit 4 is a portion which detects the power output from the solar battery 3. The power detection unit 4 is constituted by a relay circuit. Specifically, the power detection unit 4 is a relay circuit whose contacts are open (normally off/open) in a state of being not electrified. The power detection unit 4 has a configuration in which the contacts are closed when power (current) equal to or greater than a predetermined value is supplied from the solar battery 3, and electrification is provided. In the power detection unit 4, one end of a coil L constituting the relay circuit is grounded through a resistor R. For the resistor R, for example, a resistor of about 10 n to 30Ω may be used. While the relay circuit is well known and detailed description thereof will be omitted, for example, an electromagnetic relay, a solid-state relay, or the like may be used. In this embodiment, an electromagnetic relay having a coil L, a contact return spring, and the like is used as an example.

The power cutoff unit 5 is a portion which is connected between the solar battery 3 and the power detection unit 4, and cuts off power which is supplied from the solar battery 3 to the power detection unit 4. The power cutoff unit 5 is a relay circuit whose contacts are connected (normally on/closed) in a state of being not electrified. The power cutoff unit 5 outputs the output power from the solar battery 3 to the power detection unit 4 in a normal state (a state where the contacts are connected). The drive input of the power cutoff unit 5 is connected to the power supply unit 6, and when power is output from the power supply unit 6, the contacts are opened. Accordingly, the power cutoff unit 5 cuts off the power supply from the solar battery 3 to the power detection unit 4.

The power supply unit (bypass path) 6 is a bypass portion which supplies a control power to the control ECU 10 after the activation of the control ECU 10. The power supply unit 6 is a relay circuit whose contacts are open in a state where no signal is input. The power supply unit 6 is connected to the control ECU 10, and if a power supply signal output after the control ECU 10 is activated is input, the contacts are connected. Accordingly, power is output from the power supply unit 6 to the power cutoff unit 5, and the control power is supplied to the control ECU 10, and the first and second DC-DC converters 8 and 9. A diode D3 for preventing the reverse flow of the current is connected to the downstream side of the power supply unit 6.

The first DC-DC converter 8 is a portion which receives the output voltage of the solar battery 3 as an input, and steps up or down the output voltage to the voltage of the (lead battery) 12. Specifically, the first DC-DC converter 8 steps down the output voltage of the solar battery 3 from 42 V to 14 V, and supplies a charging current to the battery 12. A diode D1 for preventing the reverse flow of the current is connected between the first DC-DC converter 8 and the battery 12.

The second DC-DC converter 9 is a portion which receives the output voltage of the solar battery 3 as an input, and steps up or down the output voltage to the voltage of the HV battery 13 connected thereto. Specifically, the second DC-DC converter 9 steps up the output voltage of the solar battery 3 from 42 V to 200 V, and supplies a charging current to the HV battery 13. A diode D2 for preventing the reverse flow of the current is connected between the second DC-DC converter 9 and the HV battery 13. The charging current from the second DC-DC converter 9 is also supplied to a hybrid system (not shown).

The control ECU 10 is a portion which performs control of the first DC-DC converter 8 and the second DC-DC converter 9. Specifically, the control ECU 10 performs control of the voltage conversion ratio or the like of the first DC-DC converter 8 and the second DC-DC converter 9. The control ECU 10 also performs MPPT (Maximum Power Point Tracker) control. The maximum power point is a point where the product of a voltage and a current is maximal, and changes depending on the amount of sunlight or temperature. The MPPT control is performed such that the output voltage is controlled to be optimum for photovoltaic power generation with change in the amount of sunlight or temperature so as to constantly operate the solar battery 3 at the maximum power point. As the method for the MPPT control, for example, a so-called hill-climbing method may be used.

The control ECU 10 having the above-described configuration is activated when the power supplied from the solar battery 3 becomes equal to or greater than a predetermined value. Specifically, the control ECU 10 is activated with the control power supplied when the output power from the solar battery 3 becomes equal to or greater than the predetermined value and the contacts in the power detection unit 4 are connected. The control ECU 10 receives the output power of the solar battery 3 as an input after activation, and determines whether or not the output power is equal to or smaller than the predetermined value. When it is determined that the output power of the solar battery 3 is equal to or smaller than the predetermined value, the control ECU 10 restarts the operation of the power detection unit 4, that is, connects the contacts of the power cutoff unit 5. The control ECU 10 controls the first and second DC-DC converters 8 and 9 to end charging of the battery 12, and turns off the power supply unit 6 to end the activation of the entire charging control system 7. A control power is also supplied from a hybrid computer (not shown) to the control ECU 10.

The monitoring ECU 11 is a portion which monitors the HV battery 13. The monitoring ECU 11 performs control for preventing overcharging of the HV battery 13 to protect the HV battery 13. The monitoring ECU 11 is provided with a current sensor which measures a current between the second DC-DC converter 9 and the HV battery 13. The monitoring ECU 11 estimates the charged state of the HV battery 13, and when the HV battery 13 is in a fully charged state, does not output a charging permission signal representing the permission for charging from the second DC-DC converter 9 to the HV battery 13 to the control ECU 10 (charging permission signal=OFF). Accordingly, overcharging in the HV battery 13 is prevented. When the HV battery 13 is not in the fully charged state, the monitoring ECU 11 outputs the charging permission signal for permitting charging from the second DC-DC converter 9 to the HV battery 13 to the control ECU 10 (charging permission signal=ON).

If the charging permission signal output from the monitoring ECU 11 is received, the control ECU 10 controls the second DC-DC converter 9. Accordingly, the second DC-DC converter 9 performs conversion from 42 V to 200 V, and supplies the charging current to the HV battery 13 with the maximum output of the solar battery 3. Similarly to the control ECU 10, the monitoring ECU 11 is activated when the power supplied from the solar battery 3 becomes equal to or greater than a predetermined value. A control power is also supplied from the hybrid computer (not shown) to the monitoring ECU 11.

Figure 2:
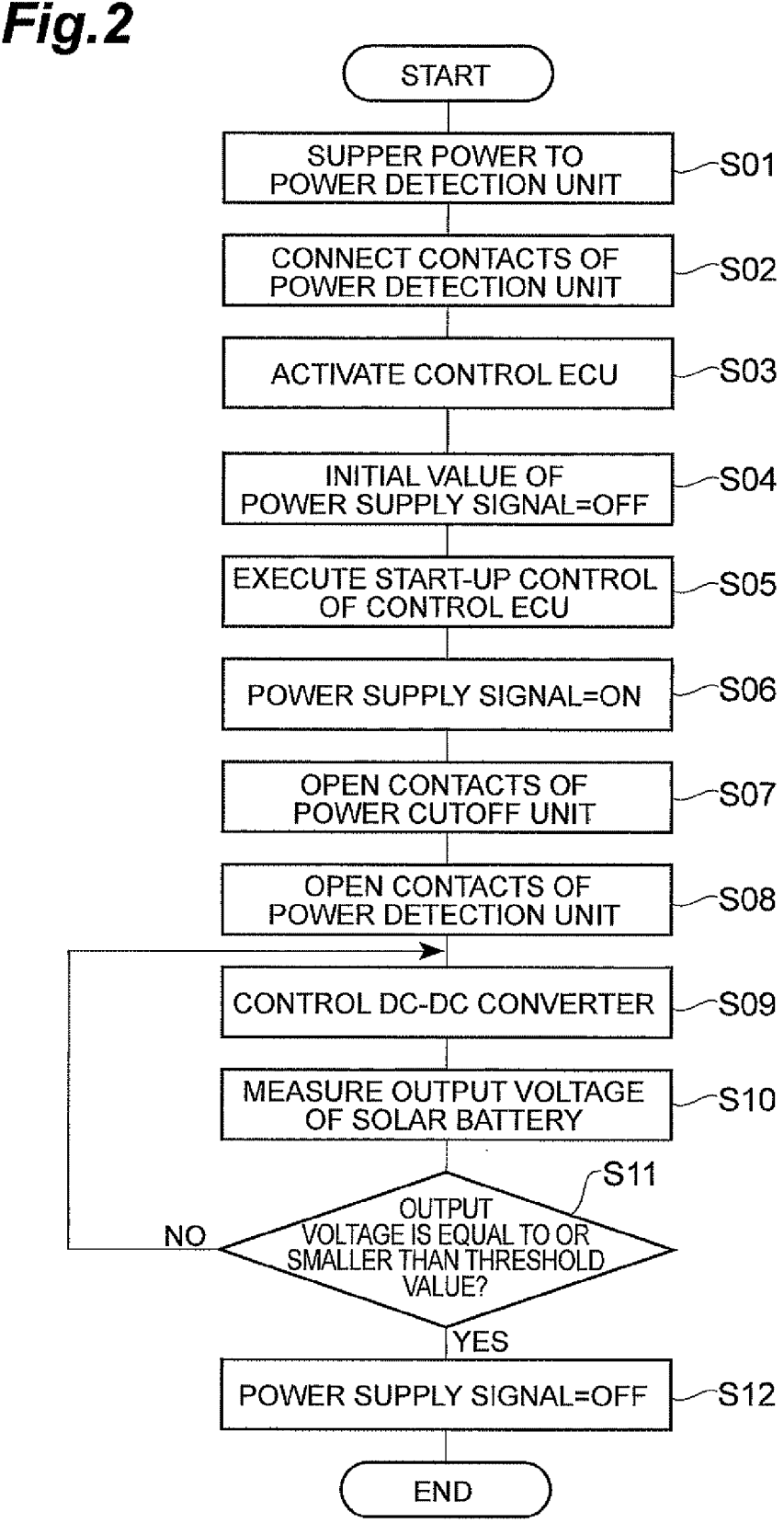
FIG. 2 is a flowchart showing the operation of the charging system.

Subsequently, the operation of the charging system 1 will be described with reference to FIG. 2. FIG. 2 is a flowchart showing the operation of the charging system.

As shown in FIG. 2, first, the power supplied from the solar battery 3 is supplied to the power detection unit 4 through the power cutoff unit 5 (Step S01). In the power detection unit 4, when the output from the solar battery 3 reaches power (current) equal to or greater than the predetermined value, the contacts are connected (Step S02).

Figure 3:
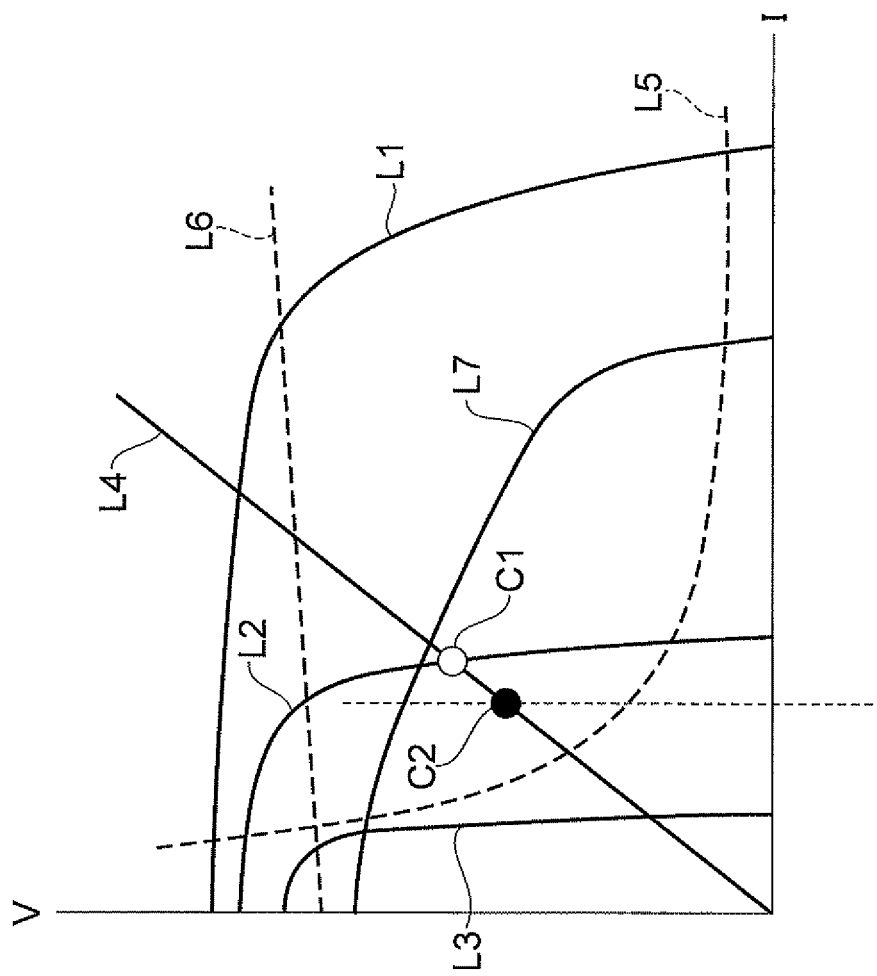
FIG. 3 is a diagram illustrating an operating point of a power detection unit.

An operating point (a predetermined power with which the contacts are connected) of the power detection unit 4 will be described. FIG. 3 is a diagram illustrating an operating point of the power detection unit. FIG. 3 shows the voltage-current characteristics L1 to L3 of the solar battery 3, the voltage-current characteristic L4 of the resistor R and the coil L of the power detection unit 4, and a control end determination threshold value L5. The line L1 represents the voltage-current characteristic in a bright state where sunlight is strong, the line L2 represents the voltage-current characteristic in a slightly bright state where sunlight is weak, and the line L3 represents the voltage-current characteristic in a dark state.

As shown in FIG. 3, in the state (the state of the line L2) where the charging control system 7 is not operated, that is, the contacts of the power detection unit 4 are opened because sunlight is weak and the output power is small, since the output current from the solar battery 3 passes through the coil L and the resistor R, the current/voltage output from the solar battery 3 becomes an intersection point C1 where the line L2 and the line L4 intersect each other.

In the state (the state of the line L1) where sunlight is strong, the output power is equal to or greater than the predetermined value, and the charging control system 7 is operated, that is, the contacts of the power supply unit 6 are connected, the control ECU 10 controls the first and second DC-DC converters 8 and 9 to search for the maximum power point, and power is output from the solar battery 3. If darkness gradually increases from this state, the output power from the solar battery 3 is lowered, and charging of the battery 12 is stopped. A threshold value when charging is stopped is the control determination threshold value L5, and the control determination threshold value L5 is set to a boundary value at which the output power from the solar battery 3 taking into consideration conversion losses of the first and second DC-DC converters 8 and 9 falls below power which is consumed in the ECU 10 and 11 or the like.

The voltage-current characteristics of the solar battery 3 change depending on light intensity like the lines L1 to L3 shown in FIG. 3, and the maximum power point usually appears on a line L6. However, in a solar battery array in which a plurality of solar battery cells are connected in series, when some solar battery cells fail, when shadow is partially made, or when any abnormality occurs in the solar battery 3 and performance is degraded, a voltage-current characteristic like a line L7 may be obtained. In this case, the maximum power point is significantly shifted from the position of the line L6. For this reason, the control determination threshold value L5 is set over a wide range.

An operating point (hereinafter, referred to as a relay-on point) C2 where the power detection unit 4 is turned on is set so as to be outside the control determination threshold value L5 on the line L4. Specifically, a threshold-value current at which the contacts are connected (the relay is on) is set in the relay circuit constituting the power detection unit 4, and the relay-on point C2 becomes an intersection point with the line L4. When the relay-on point C2 is set inside the control determination value D5, the control of the charging control system 7 may end depending on the output of the solar battery 3 and the charging control system 7 may be inactivated. Simultaneously, the power detection unit 4 may be turned on, and the charging control system may be repeatedly activated and inactivated. Accordingly, the relay-on point C2 where the contacts in the power detection unit 4 are connected is set at a position outside the control end determination threshold value D5. The slope of the line L4 is set by the resistance value of the resistor R and the resistance value of the coil L. The value of the relay-on point C2 is set by the number of turns of the coil L, the spring constant of a contact return spring, and the like.

Returning to FIG. 2, if the contacts in the power detection unit 4 are connected, the control power is supplied to the control ECU 10 and the control ECU 10 is activated (Step S03). In the control ECU 10, the power supply signal to the power supply unit 6 is set to an initial value (=OFF) (Step S04). Next, start-up control of the control ECU 10 is executed (Step S05). If the start-up control of the control ECU 10 is executed, the power supply signal is output from the control ECU 10 to the power supply unit 6 (=ON) (Step S06). Accordingly, the contacts of the power supply unit 6 are connected, and the power supply unit 6 is turned on, such that the voltage from the battery 12 is supplied to the control ECU 10. Next, if the power supply unit 6 is turned on, the charging current is supplied to the power cutoff unit 5 and the contacts are opened (Step S07). Accordingly, no power is supplied to the power detection unit 4, and the contacts of the power detection unit 4 are opened (Step S08). While the power supply from the power detection unit 4 to the control ECU 10 or the like is cut off, since power is supplied from the power supply unit 6 through the diode D3 at this time, the control ECU 10 or the like is maintained in a started-up state.

If the control ECU 10 starts up, the control of the first DC-DC converter 8 and the second DC-DC converter 9 is executed by the control ECU 10 (Step S09). Each of the first and second DC-DC converters 8 and 9 includes a power measurement unit (not shown), and the power (voltage and current) output from the solar battery 3 is measured by the power measurement unit (Step S10). The control ECU 10 determines whether or not the output power of the solar battery 3 is equal to or smaller than a threshold value (the control determination threshold value L5 shown in FIG. 3) (Step S11). When it is determined that the output power from the solar battery 3 is equal to or smaller than the threshold value, the output of the power supply signal to the power supply unit 6 is stopped (=OFF) (Step S12). Accordingly, the operation of the entire charging control system 7 is stopped. When it is determined that the output power from the solar battery 3 is not equal to or smaller than the threshold value, the process returns to Step S09, and the above processing is repeated.

As described above, in the charging system 1 including the charging device 2, when the output power from the solar battery 3 is equal to or greater than the predetermined value, power is supplied to the charging control system 7 which controls charging of the batteries 12 and 13. Accordingly, when the output power from the solar battery 3 is small, since the charging control system 7 is not activated, no power is consumed in the charging control system 7. As a result, the battery 12 can be prevented from being depleted. When the output power from the solar battery 3 is equal to or greater than the predetermined value, since charging of the batteries 12 and 13 is performed by the charging control system 7, charging of the batteries 12 and 13 can be appropriately performed.

The power detection unit 4 is connected between the solar battery 3 and the charging control system 7, and detects the power output from the solar battery 3. The power detection unit 4 is operated when the power output from the solar battery 3 becomes equal to or greater than the predetermined value, and the power for activating the charging control system 7 is supplied. In this case, when the output power equal to or greater than the predetermined value is supplied from the solar battery 3 to the power detection unit 4, the power detection unit 4 is operated and the power for activation is supplied to the charging control system 7, thereby appropriately activating the charging control system 7.

The power cutoff unit 5 is connected between the solar battery 3 and the power detection unit 4, and cuts off the power supply from the solar battery 3 to the power detection unit 4. When the power supply to the charging control system 7 is performed, the power cutoff unit 5 cuts off the power supply from the solar battery 3 to the power detection unit 4. In this case, power consumption in the power detection unit 4 can be suppressed after the charging control system 7 is activated. Therefore, the power output from the solar battery 3 can be efficiently charged to the batteries 12 and 13.

The battery 12 supplies power to the charging control system 7 through the power supply unit 6, and before the power cutoff unit 5 cuts off the power supply from the solar battery 3 to the power detection unit 4, power is supplied from the battery 12 to the charging control system 7 through the power supply unit 6. In this case, even when the power supply to the power detection unit 4 is cut off, power can be supplied to the charging control system 7.

The charging control system 7 measures the power output from the solar battery 3, when the measured output from the solar battery 3 becomes equal to or smaller than a predetermined determination threshold value (control end determination threshold value L5), restarts the power supply from the solar battery 3 to the power detection unit 4, and stops the operation. In this case, when the output from the solar battery 3 is lowered, the operation of the charging control system 7 is stopped, thereby reliably preventing the batteries 12 and 13 from being depleted. If the power supply from the solar battery 3 to the power detection unit 4 restarts, even when the output power from the solar battery 3 becomes equal to or greater than the predetermined value again, the charging control system 7 can be operated.

The predetermined value (relay-on point C2) of the power for operating the power detection unit 4 is greater than the determination threshold value (control end determination threshold value D5) in the charging control system 7. When the relay-on point C2 for operating the power detection unit 4 is set to be smaller than the control end determination threshold value D5, the control of the charging control system 7 may end depending on the output power of the solar battery 3, and the charging control system 7 may be inactivated. Simultaneously, the power detection unit 4 may be turned on, and the charging control system 7 may be repeatedly activated and inactivated. Accordingly, the relay-on point C2 for operating the power detection unit 4 is greater than the control end determination threshold value D5 in the charging control system 7, thereby appropriately controlling the on and off of the charging control system 7.

Second Embodiment

Figure 4:
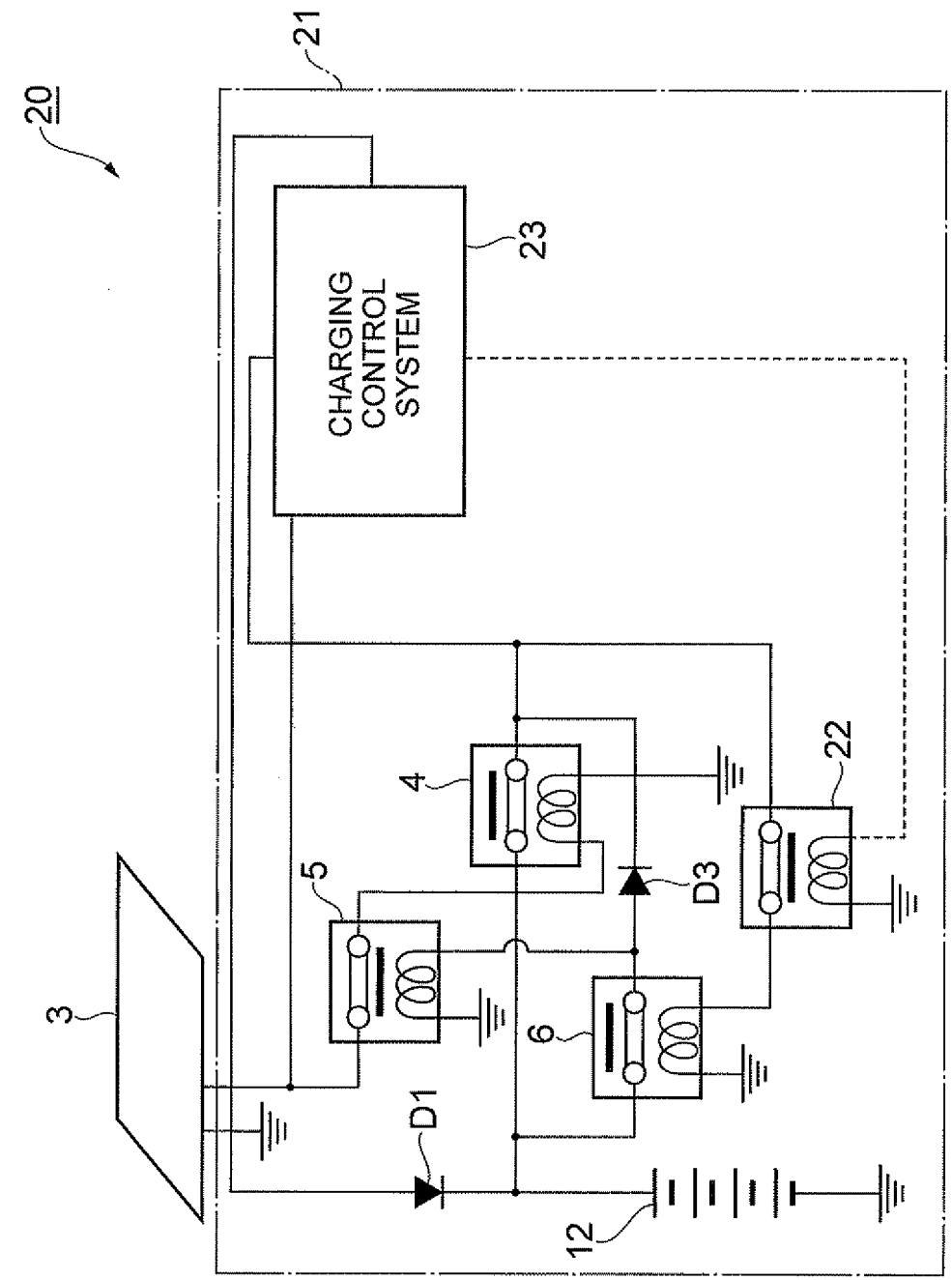
FIG. 4 is a diagram showing the configuration of a charging system including a charging device according to a second embodiment.

Subsequently, a second embodiment will be described. FIG. 4 is a diagram showing a charging system including a charging device according to the second embodiment. A charging system 20 includes a solar battery 3 and a charging device 21, and the charging device 21 includes a power relay unit 22 and a charging control system 23. Other parts in the charging system 20 are the same as those in the first embodiment.

The power relay unit 22 is a portion which is connected between a power detection unit 4 and a power supply unit 6, and supplies a control power output through the power detection unit 4 to the power supply unit 6. The power relay unit 22 is a relay circuit whose contacts are connected (normally on/closed) in a state where no signal is input. If the contacts in the power detection unit 4 are connected, the control power is supplied to the power relay unit 22. The power relay unit 22 is connected to the charging control system 23, and if a disconnection signal output from a control ECU 24 (described below) included in the charging control system 23 is received, opens the contacts. Accordingly, the power relay unit 22 cuts off the supply of the control power from the power detection unit 4 to the power supply unit 6.

As described above, the charging control system 23 has the control ECU 24. The control ECU 24 is activated when the control power is input. The control ECU 24 receives the output power from the solar battery 3 as an input, and when the output power becomes equal to or smaller than a predetermined threshold value, outputs a disconnection signal to open the contacts to the power relay unit 22. Though not shown in FIG. 4, as in the first embodiment, first and second DC-DC converters 8 and 9, a monitoring ECU 11, and the like are included in the charging control system 23, and an HV battery 13 is connected to the charging control system 23.

Subsequently, the operation of the charging system 20 will be described with reference to FIG. 4. As shown in FIG. 4, first, the power supplied from the solar battery 3 is supplied to the power detection unit 4 through the power cutoff unit 5. In the power detection unit 4, when the output from the solar battery 3 reaches power (current) equal to or greater than a predetermined value, the contacts are connected. Accordingly, a control power is supplied to the charging control system 23 through the power detection unit 4, and the charging control system 23 (control ECU 24) is activated. The control power is also supplied to the power relay unit 22 through the power detection unit 4.

Subsequently, the control power supplied to the power relay unit 22 is supplied to the power supply unit 6. In the power supply unit 6 to which the control power is supplied, the contacts are connected. If the control power is supplied to the power cutoff unit 5 through the power supply unit 6, the power cutoff unit 5 cuts off the power supply to the power detection unit 4. Accordingly, power consumption in the power detection unit 4 is suppressed.

If the charging control system 23 is activated, the control ECU 24 embedded in the charging control system 23 measures the output power from the solar battery 3, and determines whether or not the output power is equal to or smaller than a threshold value (the control determination threshold value L5 shown in FIG. 3). When it is determined that the output power from the solar battery 3 is equal to or smaller than the threshold value, the control ECU 24 outputs the disconnection signal to the power relay unit 22. Accordingly, since the contacts are opened in the power relay unit 22, and the contacts of the power supply unit 6 are opened, the supply of the control power to the charging control system 23 is stopped, such that charging of the batteries 12 and 13 is stopped and the operation of the entire charging control system 23 is stopped.

As described above, in the charging system 20 including the charging device 21, as in the first embodiment, when the output power from the solar battery 3 is equal to or greater than the predetermined value, power is supplied to the charging control system 23 which controls charging of the batteries 12 and 13. Accordingly, when the output power from the solar battery 3 is small, since the charging control system 23 is not activated, no power is consumed in the charging control system 23. As a result, the battery 12 can be prevented from being depleted. When the output power from the solar battery 3 is equal to or greater than the predetermined value, since charging of the batteries 12 and 13 is performed by the charging control system 23, charging of the batteries 12 and 13 can be appropriately performed.

Third Embodiment

Figure 5:
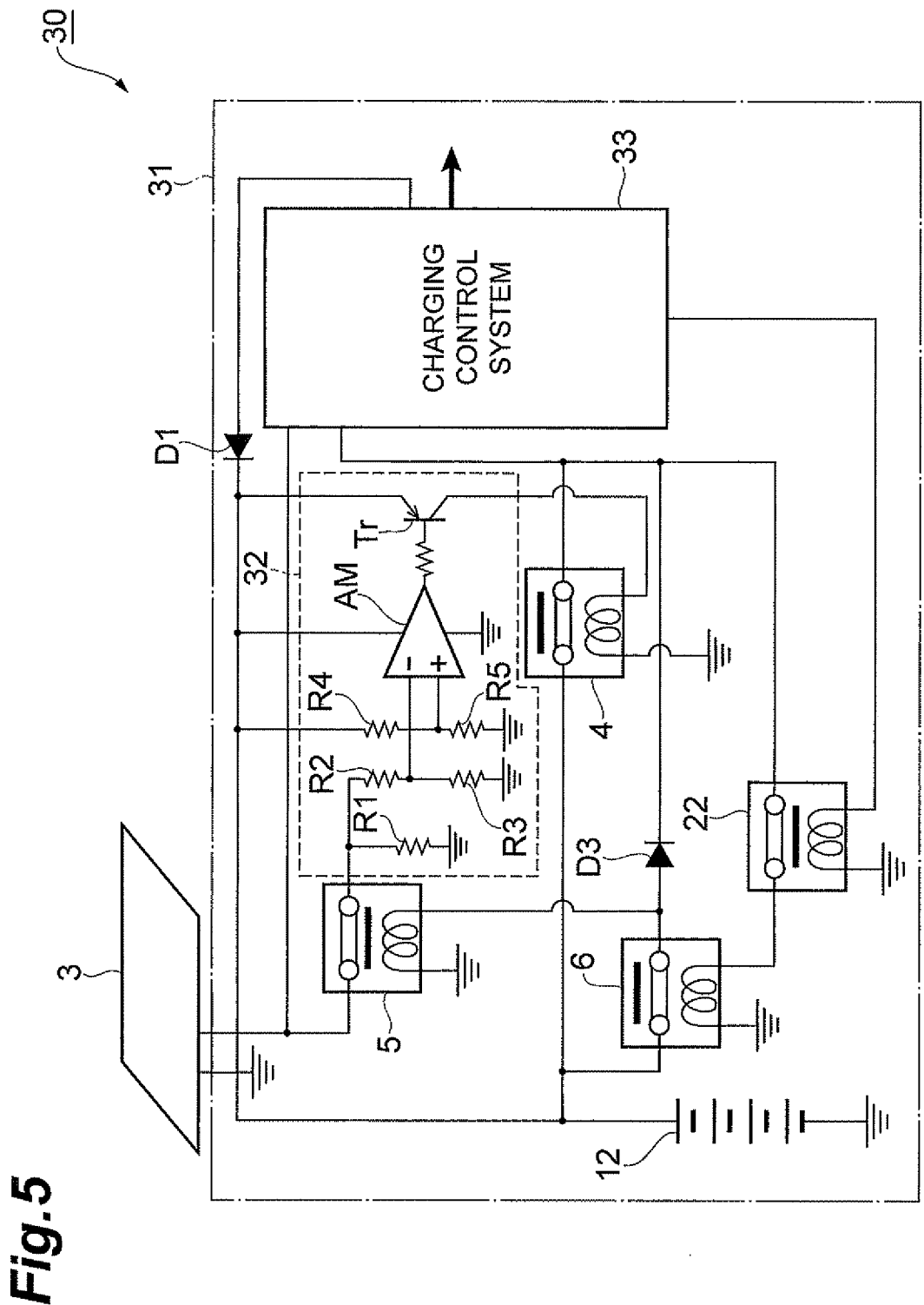
FIG. 5 is a diagram showing the configuration of a charging system including a charging device according to a third embodiment.

Subsequently, a third embodiment will be described. FIG. 5 is a diagram showing a charging system including a charging device according to the third embodiment. A charging system 30 shown in FIG. 5 includes a solar battery 3 and a charging device 31, and the charging device 31 includes a power detection unit 32 and a charging control system 33. Other basic parts in the charging system 30 are the same as those in the second embodiment.

The power detection unit 32 is a portion which detects the power output from the solar battery 3. The power detection unit 32 includes a plurality of resistors R1 to R5, an amplifier AM, and a transistor Tr. The resistor R1 is set to, for example, $10\Omega$ to $30\Omega$, the resistor R2 is set to, for example, $19K\Omega$, the resistor R3 is set to, for example, $6\ k\Omega$, the resistor R4 is set to, for example, $1\ M\Omega$, and the resistor R5 is set to, for example, $1\ M\Omega$. In the power detection unit 32, if the output power of the solar battery 3 is input and the voltage of the resistor R1 increases and becomes a predetermined voltage (for example, 25 V), the voltage of an inverting input to the amplifier AM exceeds a predetermined voltage (for example, 6 V), and the output of the amplifier AM is inverted. The power detection unit 32 has a configuration in which, if the output of the amplifier AM is inverted, the transistor Tr is ON. While the power detection unit 32 usually uses the power of the battery 12, power consumption can be very low.

The charging control system 33 has a control ECU 34. The control ECU 34 has a function of preventing the output of the disconnection signal to the power relay unit 22 at the beginning of the start-up of the charging control system 33, in addition to a function of outputting the disconnection signal to the power relay unit 22 when it is determined that the output power from the solar battery 3 is equal to or smaller than the threshold value (the control determination threshold value L5 shown in FIG. 3). Though not shown in FIG. 5, as in the first embodiment, first and second DC-DC converters 8 and 9, a control ECU 10, a monitoring ECU 11, and the like are included in the charging control system 33, and an HV battery 13 is connected to the charging control system 33.

Figure 6:
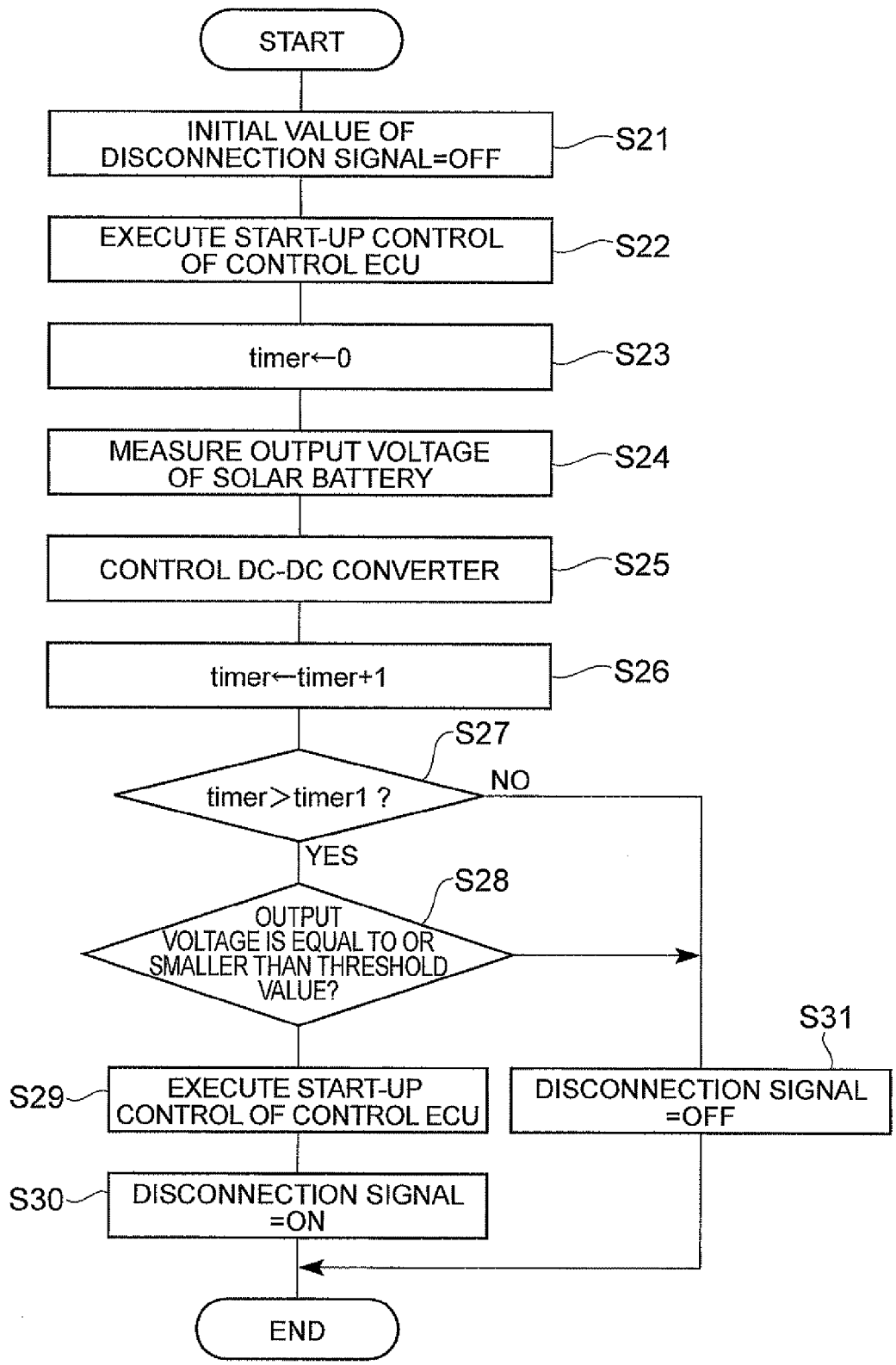
FIG. 6 is a flowchart showing the operation of the charging control system.

The operation of the charging control system 33 will be described with reference to FIG. 6. FIG. 6 is a flowchart showing the operation of the charging control system.

As shown in FIG. 6, first, the initial value of the disconnection signal to the power relay unit 22 is set to be off (Step S21). The start-up control of the control ECU 34 is executed (Step S22). If the start-up control of the control ECU 34 is executed, "timer (internal variable)" in the control ECU 34 is set to "0" (Step S23). The variable "timer" is used so as to prevent the output of the disconnection signal to the power relay unit 22 at the beginning of the start-up of the charging control system 33.

Next, in the control ECU 34, the output power of the solar battery 3 is input and the power is measured (Step S24). The output voltage of the solar battery 3 is converted to the voltage of each of the batteries 12 and 13 in each of the DC-DC converters 8 and 9 (Step S25), and charging of the batteries 12 and 13 starts. "+1" is added to the value of "timer" (Step S26), and it is determined in the control ECU 34 whether or not the value of "timer" is greater than "timer1" which is a fixed value (waiting time) (timer>timer1) (Step S27).

When it is determined that the value of "timer" is greater than "timer1", the process progresses to Step S28. When it is determined that the value of "timer" is not greater than "timer1", the output of the disconnection signal is set to be off (Step S31).

In Step S28, it is determined by the control ECU 34 whether or not the output power from the solar battery 3 is equal to or smaller than the threshold value. When it is determined that the output power from the solar battery 3 is equal to or smaller than the threshold value, the start-up control of the charging control system 7 is executed (Step S29), and the disconnection signal of the power relay unit 22 is on (Step S30). When it is determined that the output power of the solar battery 3 is not equal to or smaller than the threshold value, the processing of Step S31 is executed.

Subsequently, the operation of the charging system 30 will be described with reference to FIG. 5. As shown in FIG. 5, first, the power supplied from the solar battery 3 is supplied to the power detection unit 32 through the power cutoff unit 5. In the power detection unit 32, as described above, if the output power from the solar battery 3 is input, and the voltage of the resistor R increases and becomes a predetermined voltage, the voltage of the inverting input to the amplifier AM exceeds a predetermined voltage, and the output of the amplifier AM is inverted. In the power detection unit 32, if the output of the amplifier AM is inverted, the transistor Tr is turned on.

If the transistor Tr is turned on, power is supplied from the power detection unit 32 to the power detection unit 4, and the contacts of the power detection unit 4 are connected. Accordingly, the control power is supplied to the charging control system 33, and the charging control system 33 is activated. The control power is also supplied to the power relay unit 22 through the power detection unit 4.

Subsequently, the control power supplied to the power relay unit 22 is supplied to the power supply unit 6. In the power supply unit 6 to which the control power is supplied, the contacts are connected. If the control power is supplied to the power cutoff unit 5 through the power supply unit 6, since the power supply to the power detection unit 32 is cut off, the power supply to the power detection unit 4 is also cut off.

If the charging control system 33 is activated, the above-described control is executed. Specifically, the control ECU 34 embedded in the charging control system 33 measures the output power from the solar battery 3, and determines whether or not the output power is equal to or smaller than the threshold value. When it is determined that the output power from the solar battery 3 is equal to or smaller than the threshold value, the control ECU 34 turns on (outputs) the disconnection signal to the power relay unit 22. Accordingly, since the contacts are opened in the power relay unit 22, and the contacts of the power supply unit 6 are opened, the supply of the control power to the charging control system 33 is stopped, such that charging of the batteries 12 and 13 is stopped and the operation of the entire charging control system 33 is stopped.

As described above, in the charging system 30 including the charging device 31, as in the first embodiment, when the output power from the solar battery 3 is equal to or greater than the predetermined value, power is supplied to the charging control system 33 which controls charging of the batteries 12 and 13. Accordingly, when the output power from the solar battery 3 is small, since the charging control system 33 is not activated, no power is consumed in the charging control system 33. Since power consumption in the power detection unit 32 is very low, the battery 12 can be prevented from being depleted in the substantial usage environment. When the output power from the solar battery 3 is equal to or greater than the predetermined value, since charging of the batteries 12 and 13 is performed by the charging control system 33, charging of the batteries 12 and 13 can be appropriately performed.

Fourth Embodiment

Figure 7:
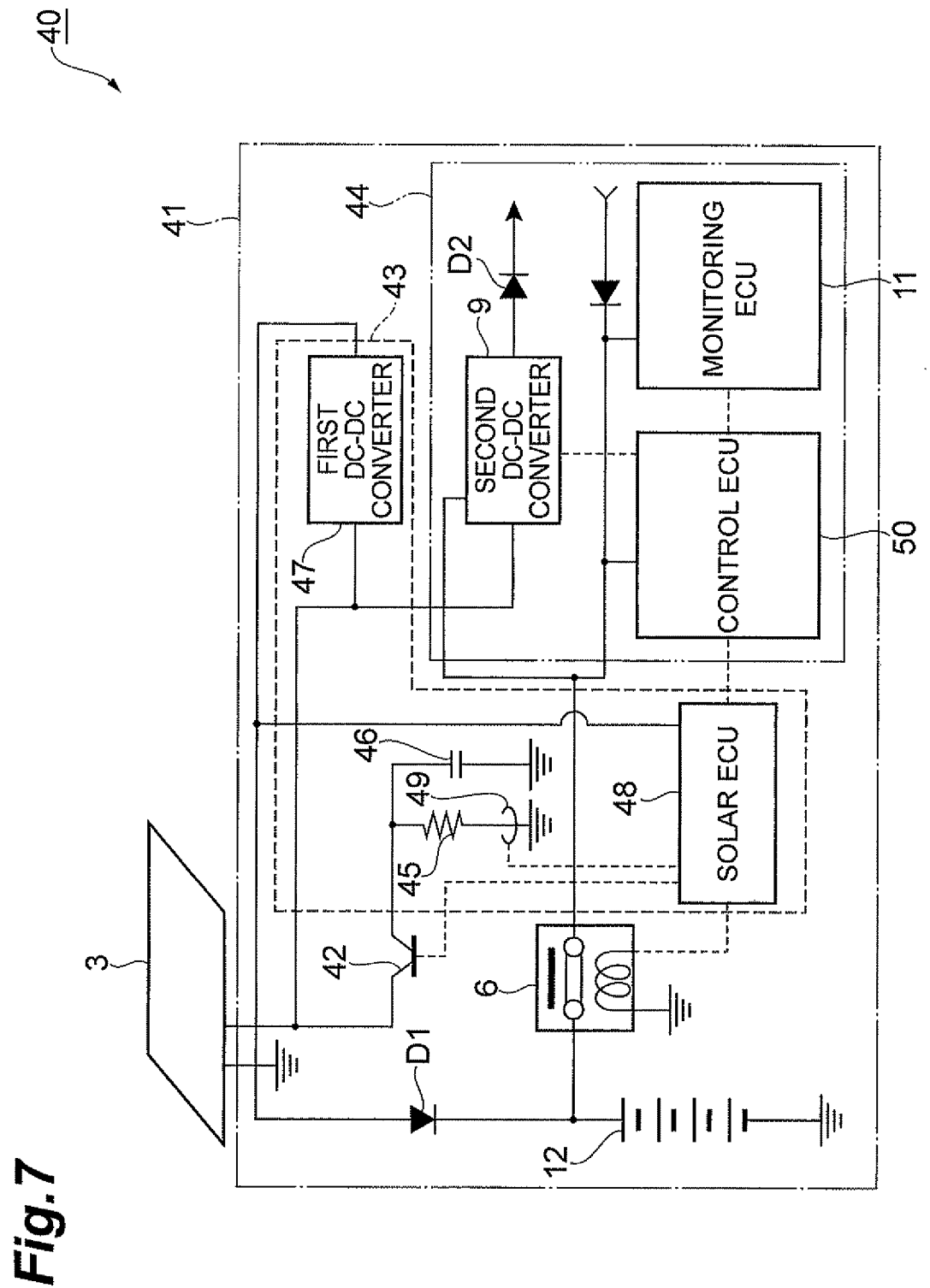
FIG. 7 is a diagram showing the configuration of a charging system including a charging device according to a fourth embodiment.

Subsequently, a fourth embodiment will be described. FIG. 7 is a diagram showing a charging system including a charging device according to the fourth embodiment. A charging system 40 shown in FIG. 7 includes a solar battery 3 and a charging device 41, and the charging device 41 includes a power cutoff unit 42, a power detection unit 43, and a charging control system 44.

The power cutoff unit 42 is a solid-state relay which is made of, for example, a semiconductor. The power cutoff unit 42 has a configuration in which the contacts are connected (normally on/closed) in a state of being not electrified. The power cutoff unit 42 outputs the output power from the solar battery 3 to the power detection unit 43 in an electrification state (a state where the contacts are connected). The power cutoff unit 42 is connected to a solar ECU 48, and when disconnection is output from the solar ECU 48, opens the contacts. Accordingly, the power cutoff unit 42 cuts off the power supply from the solar battery 3 to the power detection unit 43.

The power detection unit 43 includes a resistor 45, a capacitor 46, a first DC-DC converter 47, and a solar ECU 48. The first DC-DC converter 47 is configured to be independently activated with the output power from the solar battery 3. The first DC-DC converter 47 is activated when the output power of the solar battery 3 is input.

The solar ECU 48 is activated when the first DC-DC converter 47 is activated. The solar ECU 48 includes a current sensor 49. The current sensor 49 is connected to the downstream side of the resistor 45, and detects a current passing through the resistor 45. The solar ECU 48 detects the current value detected by the current sensor 49, and when the current value becomes equal to or greater than a threshold value, outputs a power supply signal to the power supply unit 6. If the power supply signal is output to the power supply unit 6, the solar ECU 48 outputs the disconnection signal to the power cutoff unit 42.

The charging control system 44 has a control ECU 50. The control ECU 50 controls a second DC-DC converter 9. When it is determined that the output power from the solar battery 3 is equal to or smaller than the threshold value (the control determination threshold value L5 shown in FIG. 3), the control ECU 50 outputs the disconnection signal to the solar ECU 48. The monitoring ECU 11 has the same configuration as the first embodiment.

Subsequently, the operation of the charging system 40 will be described with reference to FIG. 6. As shown in FIG. 6, first, the power supplied from the solar battery 3 is supplied to the power detection unit 43 through the power cutoff unit 42. When the current sensor 49 of the solar ECU 48 detects that the output from the solar battery 3 in the power detection unit 43 reaches power (current) equal to or greater than a predetermined value, the power supply signal is output from the solar ECU 48 to the power supply unit 6. Accordingly, the contacts of the power supply unit 6 are connected, and the control power is supplied to the charging control system 23, such that the charging control system 44 is activated.

Subsequently, if the control power is supplied from the power supply unit 6 to the charging control system 44, the disconnection signal is output from the solar ECU 48 to the power cutoff unit 42. Accordingly, the power supply from the solar battery 3 to the power detection unit 43 is cut off, and power consumption in the power detection unit 43 is suppressed.

If the charging control system 44 is activated, the control ECU 50 measures the output power from the solar battery 3, and determines whether or not the output power is equal to or smaller than the threshold value (the control determination threshold value L5 shown in FIG. 3). When it is determined that the output power from the solar battery 3 is equal to or smaller than the threshold value, the control ECU 50 outputs the disconnection signal to the solar ECU 48, and the disconnection signal is output from the solar ECU 48 to the power supply unit 6. Accordingly, since the contacts of the power supply unit 6 are opened, the supply of the control power to the charging control system 44 is stopped, such that charging of the batteries 12 and 13 is stopped and the operation of the entire charging control system 44 is stopped.

As described above, in the charging system 40 including the charging device 41, as in the first embodiment, when the output power from the solar battery 3 is equal to or greater than the predetermined value, power is supplied to the charging control system 44 which controls charging of the batteries 12 and 13. Accordingly, when the output power from the solar battery 3 is small, since the charging control system 44 is not activated, no power is consumed in the charging control system 44. As a result, the battery 12 can be prevented from being depleted. When the output power from the solar battery 3 is equal to or greater than the predetermined value, since charging of the batteries 12 and 13 is performed by the charging control system 44, charging of the batteries 12 and 13 can be appropriately performed.

Fifth Embodiment

Subsequently, a fifth embodiment will be described. FIG. 7 is a diagram showing a charging system including a charging device according to the fifth embodiment. A charging system 60 shown in FIG. 7 includes a solar battery 3 and a charging device 61, and the charging device 61 includes a power cutoff unit 62, a power detection unit 63, and a charging control system 64.

The power cutoff unit 62 includes a first DC-DC converter 65 and a switching circuit 66. The first DC-DC converter 65 is configured to be independently activated with the output power from the solar battery 3. The first DC-DC converter 65 is activated when the output power from the solar battery 3 is input. The first DC-DC converter 65 steps up the output voltage of the solar battery 3 from 42 V to 200 V, and supplies a charging current (not shown) to an HV battery 13.

The switching circuit 66 is a portion which switches the output destination of the output power from the solar battery 3. If a switching signal output from a solar ECU 68 described below is received, the switching circuit 66 switches a connection destination. Specifically, if the switching signal is received, the switching circuit 66 switches the output destination from a resistor 69 to the HV battery 13. The initial state of the switching circuit 66 is set such that the output destination is the resistor 69.

The power detection unit 63 includes a second DC-DC converter 67, a solar ECU 68, and a resistor 69. The second DC-DC converter 67 is configured to be independently activated with the output power from the solar battery 3. The second DC-DC converter 67 is activated when the output power from the solar battery 3 is input. The second DC-DC converter 67 steps down the output voltage of the solar battery 3 from 42 V to 14 V, and supplies the charging current to the battery 12.

The solar ECU 68 is activated when the second DC-DC converter 67 is activated. The solar ECU 68 includes a current sensor 70. The current sensor 70 is connected to the downstream side of the resistor 69, and detects a current passing through the resistor 69. The solar ECU 68 detects the current value detected by the current sensor 70, and when the current value is equal to or greater than a threshold value, outputs a power supply signal to the power supply unit 6. If the power supply signal is output to the power supply unit 6, the solar ECU 68 outputs the switching signal to the power cutoff unit 62. If the disconnection signal output from the control ECU 10 of the charging control system 64 is received, the solar ECU 68 outputs the disconnection signal to the power supply unit 6.

The charging control system 64 has a control ECU 70. The control ECU 70 controls the first DC-DC converter 65. When it is determined that the output power from the solar battery 3 is equal to or greater than the threshold value (the control determination threshold value L5 shown in FIG. 3), the control ECU 70 outputs the disconnection signal to the solar ECU 68. The monitoring ECU 11 has the same configuration as the first embodiment.

Figure 8:
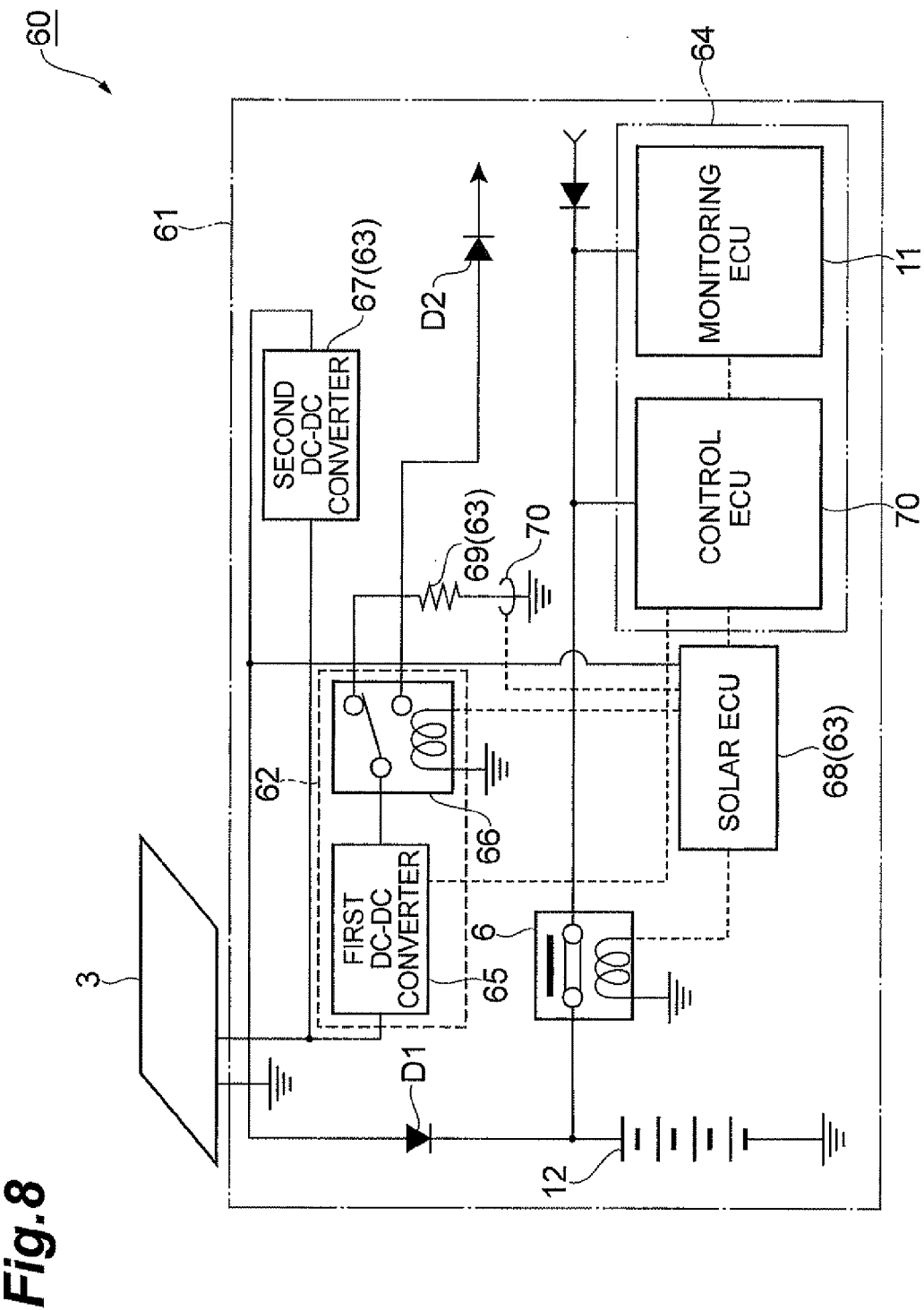
FIG. 8 is a diagram showing the configuration of a charging system including a charging device according to a fifth embodiment.

Subsequently, the operation of the charging system 60 will be described with reference to FIG. 8. As shown in FIG. 8, first, the power supplied from the solar battery 3 is supplied to the resistor 69 of the power detection unit 63 through the power cutoff unit 62. When the current sensor 70 of the solar ECU 68 detects that the output from the solar battery 3 in the power detection unit 63 reaches power (current) equal to or greater than a predetermined value, the power supply signal is output from the solar ECU 68 to the power supply unit 6. Accordingly, the contacts of the power supply unit 6 are connected, and the control power is supplied to the charging control system 64, such that the charging control system 64 is activated.

Subsequently, if the control power is supplied from the power supply unit 6 to the charging control system 64, the switching signal is output from the solar ECU 68 to the power cutoff unit 62. Accordingly, the output destination of power in the switching circuit 66 is switched from the resistor 69 to the HV battery 13 (not shown), and power consumption in the power detection unit 63 (resistor 69) is suppressed.

If the charging control system 64 is activated, the control ECU 70 measures the output power from the solar battery 3, and determines whether or not the output power is equal to or smaller than the threshold value (the control determination threshold value L5 shown in FIG. 3). When it is determined that the output power from the solar battery 3 is equal to or smaller than the threshold value, the control ECU 70 outputs the disconnection signal to the solar ECU 68, and the disconnection signal is output from the solar ECU 68 to the power supply unit 6. Accordingly, since the contacts of the power supply unit 6 are opened, the supply of the control power to the charging control system 64 is stopped, such that charging of the batteries 12 and 13 is stopped and the operation of the entire charging control system 64 is stopped.

As described above, in the charging system 60 including the charging device 61, as in the first embodiment, when the output power from the solar battery 3 is equal to or greater than the predetermined value, power is supplied to the charging control system 64 which controls charging of the batteries 12 and 13. Accordingly, when the output power from the solar battery 3 is small, since the charging control system 64 is not activated, no power is consumed in the charging control system 64. As a result, the battery 12 can be prevented from being depleted. When the output power from the solar battery 3 is equal to or greater than the predetermined value, since charging of the batteries 12 and 13 is performed by the charging control system 64, charging of the batteries 12 and 13 can be appropriately performed.

Sixth Embodiment

Figure 9:
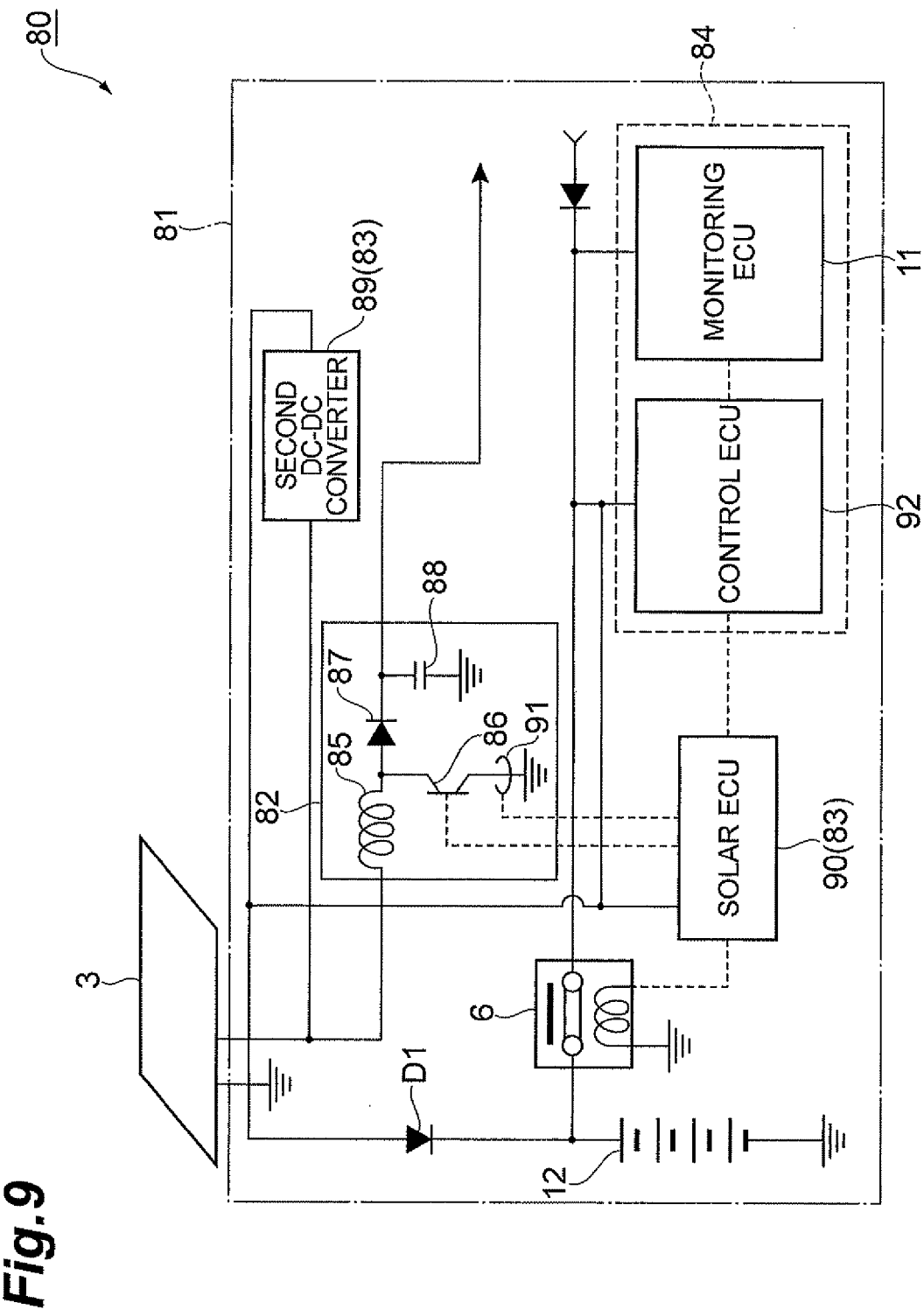
FIG. 9 is a diagram showing the configuration of a charging system including a charging device according to a sixth embodiment.

Subsequently, a sixth embodiment will be described. FIG. 9 is a diagram showing a charging system including a charging device according to the sixth embodiment. A charging system 80 shown in FIG. 9 includes a solar battery 3 and a charging device 81, and the charging device 81 includes a first DC-DC converter 82, a power detection unit 83, and a charging control system 84.

The first DC-DC converter 82 includes a coil 85, a transistor 86, a diode 87, and a capacitor 88, and is a boost chopper. The first DC-DC converter 82 is configured to be independently activated with the output power from the solar battery 3. The first DC-DC converter 82 is activated when the output power from the solar battery 3 is input. The first DC-DC converter 82 steps up the output voltage of the solar battery 3 from 42 V to 200 V, and supplies a charging current to an HV battery 13 (not shown). If the switching signal output from a solar ECU 90 is received, the transistor 86 is switched from on to off.

The power detection unit 83 includes a second DC-DC converter 89 and a solar ECU 90. The second DC-DC converter 89 is configured to be independently activated with the output power from the solar battery 3. The second DC-DC converter 89 is activated when the output power from the solar battery 3 is input. The second DC-DC converter 89 steps down the output voltage of the solar battery 3 from 42 V to 14 V, and supplies the charging current to the battery 12.

The solar ECU 90 includes a current sensor 91. The current sensor 91 is connected to the downstream side of the transistor 86, and detects a current. The solar ECU 90 acquires the current value detected by the current sensor 91, and when the current value becomes equal to or greater than a threshold value, outputs a power supply signal to the power supply unit 6. If the power supply signal is output to the power supply unit 6, the solar ECU 90 outputs the switching signal to the transistor 86 of the power cutoff unit 82. If the disconnection signal output from the control ECU 92 of the charging control system 84 is received, the solar ECU 90 outputs the disconnection signal to the power supply unit 6.

The charging control system 84 has a control ECU 92. The control ECU 92 controls a first DC-DC converter 82 and a second DC-DC converter 89. When it is determined that the output power from the solar battery 3 is equal to or smaller than a threshold value (the control determination threshold value L5 shown in FIG. 3), the control ECU 84 outputs the disconnection signal to the solar ECU 90. The monitoring ECU 11 has the same configuration as the first embodiment.

Subsequently, the operation of the charging system 80 will be described with reference to FIG. 9. As shown in FIG. 9, first, the power supplied from the solar battery 3 is supplied to the first DC-DC converter 82. When the current sensor 91 of the solar ECU 90 detects that the output from the solar battery 3 in the first DC-DC converter 82 reaches power (current) equal to or greater than a predetermined value, the power supply signal is output from the solar ECU 90 to the power supply unit 6, and the switching signal is output to the transistor 86 of the first DC-DC converter 82. Accordingly, the contacts of the power supply unit 6 are connected, and the control power is supplied to the charging control system 84, such that the charging control system 44 is activated. Simultaneously, the charging current is supplied from the first DC-DC converter 82 to the HV battery 13 (not shown).

If the charging control system 84 is activated, the control ECU 92 measures the output power from the solar battery 3, and determines whether or not the output power is equal to or smaller than the threshold value (the control determination threshold value L5 shown in FIG. 3). When it is determined that the output power from the solar battery 3 is equal to or smaller than the threshold value, the control ECU 92 outputs the disconnection signal to the solar ECU 90, and the disconnection signal is output from the solar ECU 90 to the power supply unit 6. Accordingly, since the contacts of the power supply unit 6 are opened, the supply of the control power to the charging control system 84 is stopped, such that charging of the batteries 12 and 13 is stopped and the operation of the entire charging control system 84.

As described above, in the charging system 80 including the charging device 81, as in the first embodiment, when the output power from the solar battery 3 is equal to or greater than the predetermined value, power is supplied to the charging control system 84 which controls charging of the batteries 12 and 13. Accordingly, when the output power from the solar battery 3 is small, since the charging control system 84 is not activated, no power is consumed in the charging control system 84. As a result, the battery 12 can be prevented from being depleted. When the output power from the solar battery 3 is equal to or greater than the predetermined value, since charging of the batteries 12 and 13 is performed by the charging control system 84, charging of the batteries 12 and 13 can be appropriately performed.

The invention is not limited to the foregoing embodiments. For example, although in the foregoing embodiments, an electromagnetic relay is used as a relay circuit in the power detection unit 4 or the power supply unit 6, a solid-state relay or the like may be used.

The control in the monitoring ECU 11 is not limited to the above-described control, and other kinds of control may be performed. For example, the monitoring ECU 11 estimates the charged state of the HV battery 13, and sets a charging current upper limit value $I_L$. The monitoring ECU 11 detects a system output current value $I_S$ of the charging control system 7, sets a solar battery charging current value $I_C$ $(=I_L-I_S)$, and outputs a signal representing the value of the solar battery charging current value $I_C$ to the control ECU 10. Accordingly, the control of the second DC-DC converter 9 is executed by the control ECU 10.

REFERENCE SIGNS LIST 1, 20, 30, 40, 60, 80: charging system, 2, 21, 32, 41, 61, 81: charging device, 3: solar battery, 4, 32, 43, 63, 83: power detection unit, 5, 42, 62: power cutoff unit, 6: power supply unit (bypass path), 7, 23, 33, 44, 64, 84: charging control system, 12: battery (power source), 13: HV battery.

The invention claimed is:
1. A charging device which, when power output from a solar battery is equal to or greater than a predetermined value, supplies power to a charging control system controlling charging of a battery, and when the power output from the solar battery is not equal to or greater than the predetermined value, supplies no power to the charging control system, the charging device comprising:

a power detection unit which is connected between the solar battery and the charging control system and detects the power output from the solar battery;

a power cutoff unit which is connected between the solar battery and the power detection unit and cuts off the power supply from the solar battery to the power detection unit; and a power supply unit which is connected between the power cutoff unit, the charging control system, and a power source, wherein the power detection unit operates to supply the power for activating the charging control system when the power output from the solar battery becomes equal to or greater than the predetermined value, the power supply unit outputs power to the power cutoff unit and supplies the power to the charging control system after the charging control system is activated by the power supplied from the power detection unit, and the power cutoff unit has a drive unit connected to the power supply unit and cuts off the power supply from the solar battery to the power detection unit when the power is outputted from the power supply unit.

2. The charging device according to claim 1, wherein
the power source supplies power to the charging control system through the power supply unit, and
before the power cutoff unit cuts off the power supply from the solar battery to the power detection unit, power is supplied from the power source to the charging control system through the power supply unit.

3. The charging device according to claim 1,
wherein the charging control system measures the power output from the solar battery and, when the measured power output from the solar battery is equal to or less than a predetermined determination threshold value, restarts the power supply from the solar battery to the power detection unit, and stops operation.

4. The charging device according to claim 3,
wherein the predetermined value of the power for operating the power detection unit is greater than the predetermined determination threshold value in the charging control system.

5. The charging device according to claim 1,
wherein the power detection unit is a relay circuit.

* * * * *